United States Patent [19]

Fisher et al.

[11] Patent Number: 5,276,390
[45] Date of Patent: Jan. 4, 1994

[54] SYSTEM FOR HYBRID POSITION AND FORCE CONTROL

[75] Inventors: William D. Fisher, San Jose; M. Shahid Mujtaba, Milpitas, both of Calif.

[73] Assignee: Hewlett-Packard Company, Palo Alto, Calif.

[21] Appl. No.: 60,681

[22] Filed: May 10, 1993

Related U.S. Application Data

[63] Continuation of Ser. No. 771,583, Oct. 4, 1991, abandoned.

[51] Int. Cl.$^5$ .................................................. G05B 19/42
[52] U.S. Cl. .................................. 318/568.1; 318/561; 318/568.11; 395/97; 901/9; 901/18
[58] Field of Search ................................ 318/560–; 395/80–; 901/3.5, 7, 8, 9, 12, 13, 15–; 367/125

[56] References Cited

U.S. PATENT DOCUMENTS

| | | | |
|---|---|---|---|
| 4,580,229 | 4/1986 | Koyama et al. | 364/513 |
| 4,621,332 | 11/1986 | Sugimoto et al. | |
| 4,763,276 | 8/1988 | Perreirra et al. | 395/97 |
| 4,782,258 | 11/1988 | Petrosky | 310/119 |
| 4,826,392 | 5/1989 | Hayati | 318/625 |
| 4,860,215 | 8/1989 | Seraji | 364/513 |
| 4,864,205 | 9/1989 | Fisher et al. | 318/568.11 |
| 4,980,625 | 12/1990 | Shimada | 318/568.1 |
| 4,999,553 | 3/1991 | Seraji | 318/561 |
| 5,023,808 | 6/1991 | Seraji | 364/513 |
| 5,036,498 | 7/1991 | Van Cappel | 367/125 |
| 5,044,796 | 9/1991 | Seraji | 318/568.1 |
| 5,049,796 | 9/1991 | Seraji | 318/568.1 |
| 5,056,038 | 10/1991 | Kuno | 364/513 |

*Primary Examiner*—Paul Ip

[57] ABSTRACT

A hybrid position and force control system for a robotic manipulator. A displacement error signal of an end effector such as a robotic hand is multiplied by a pseudo-inverse of a matrix product of a selection matrix and a Jacobian matrix to provide a joint displacement error signal in the coordinates of the various joints of the manipulator. The system may be tuned for obstacle avoidance and the like by means of a joint tuning signal having displacement and force components each produced by multiplying a user-provided tuning signal by a matrix difference between an identity matrix and a matrix product of a pseudo-inverse of the Jacobian mattrix and the Jacobian matrix.

8 Claims, 7 Drawing Sheets

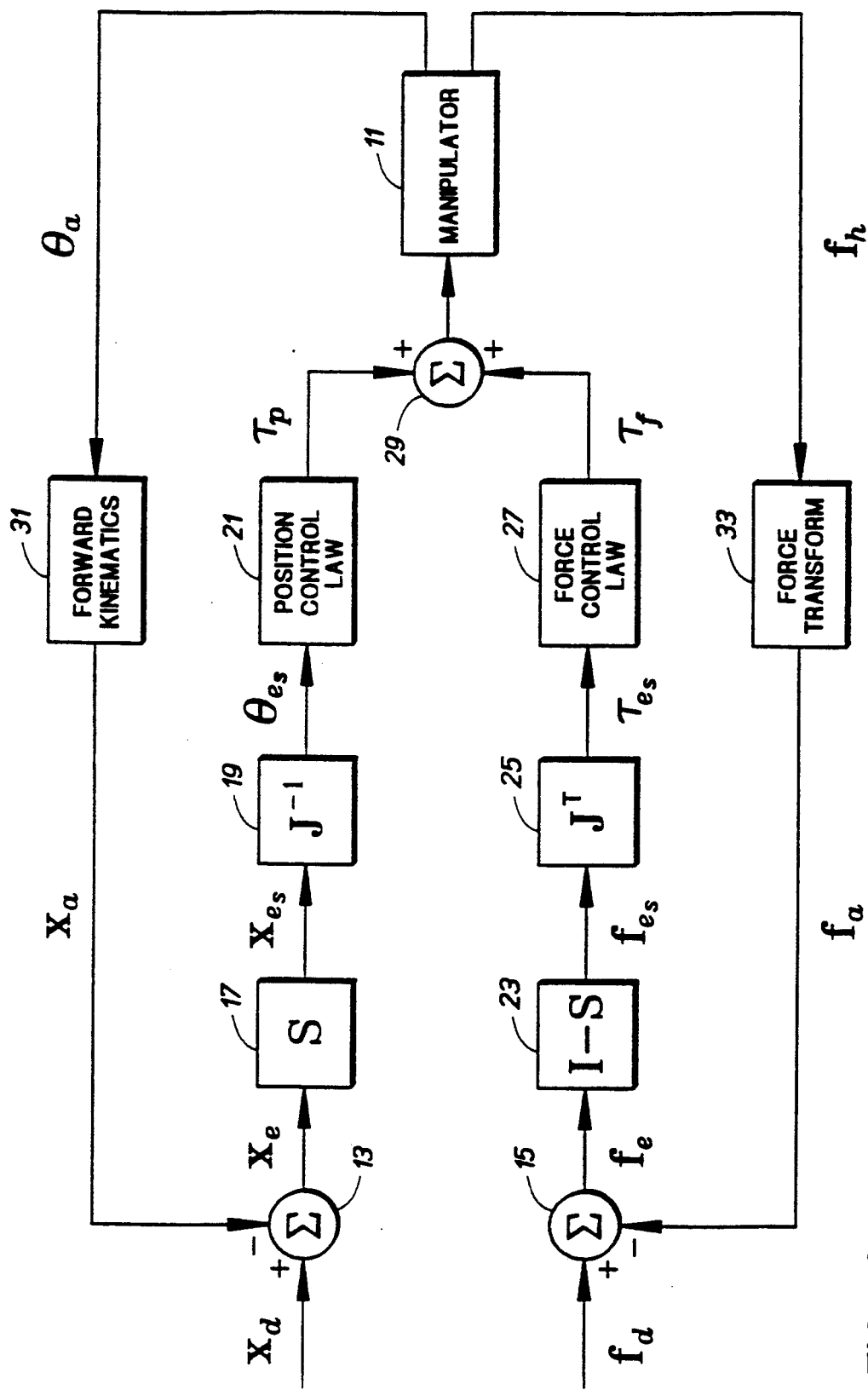
FIG._2 (PRIOR ART)

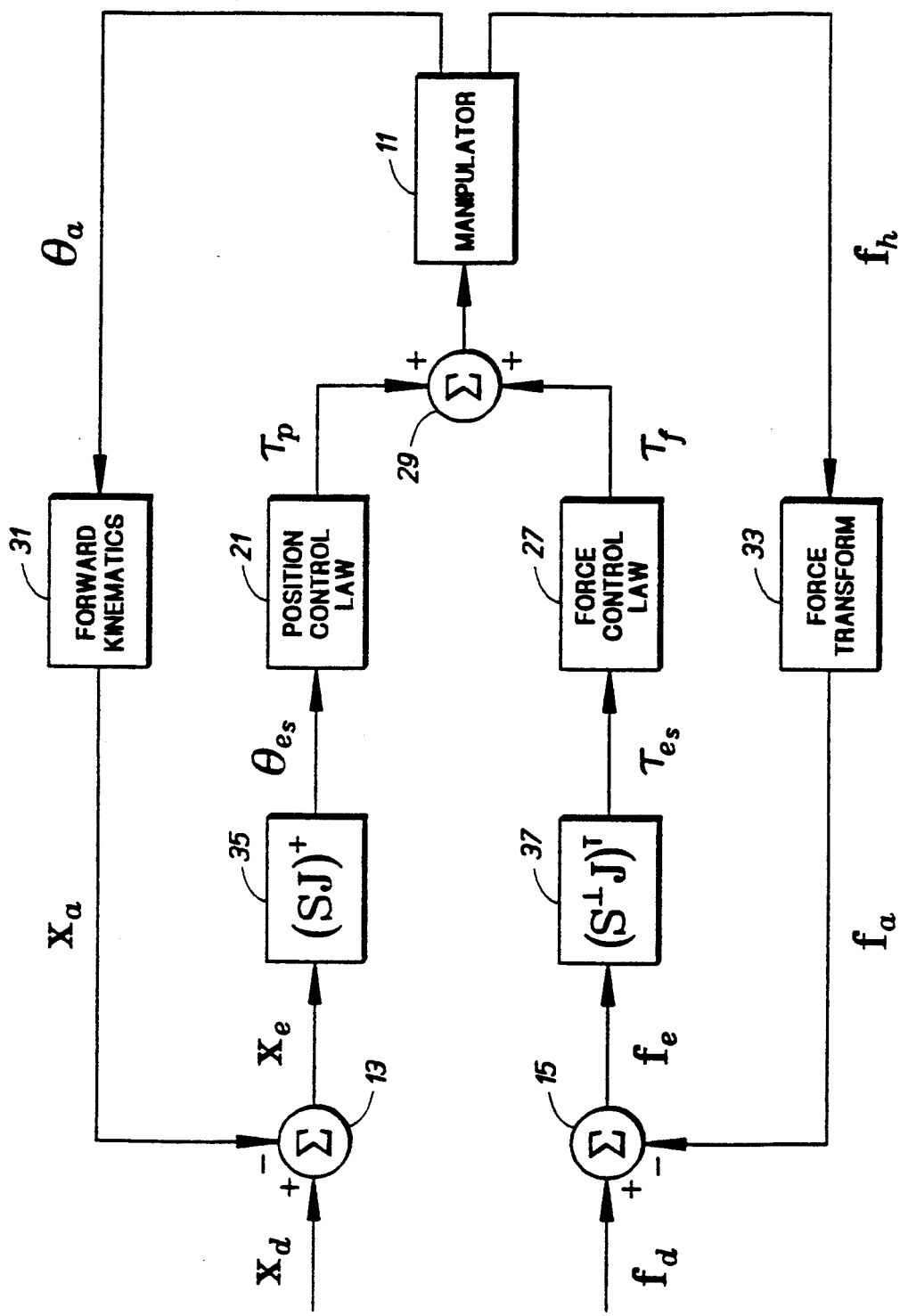
FIG._3

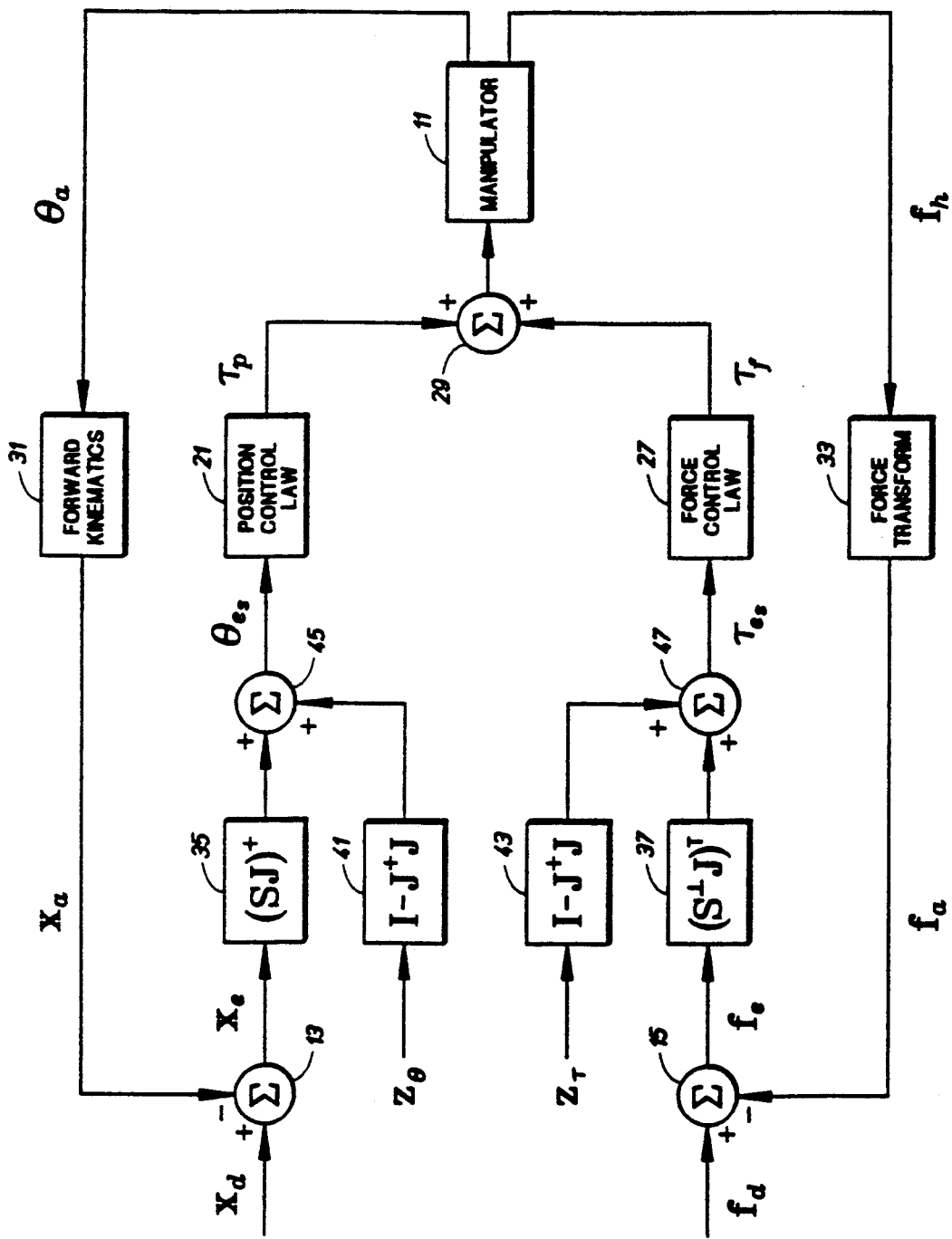
FIG._4

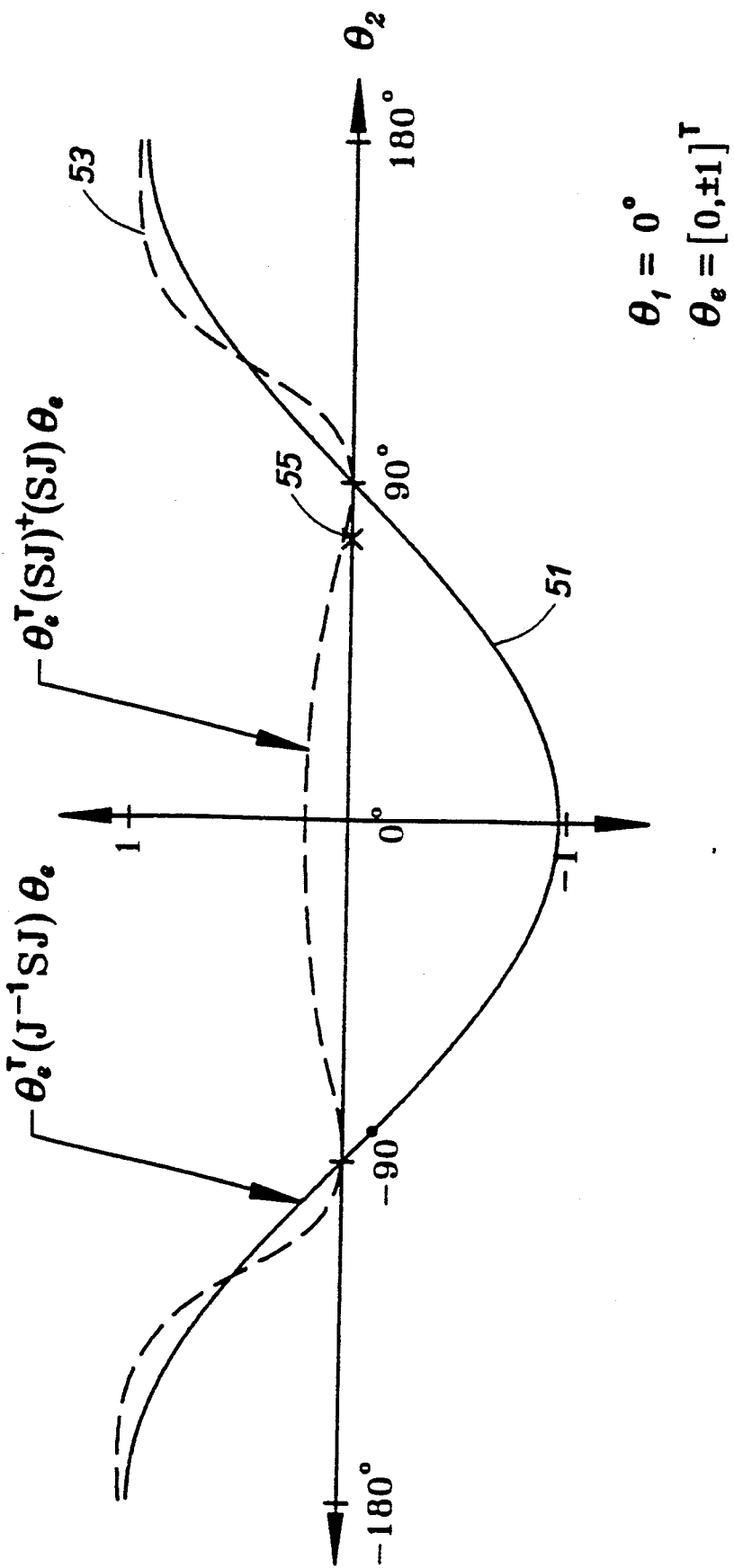
FIG._5

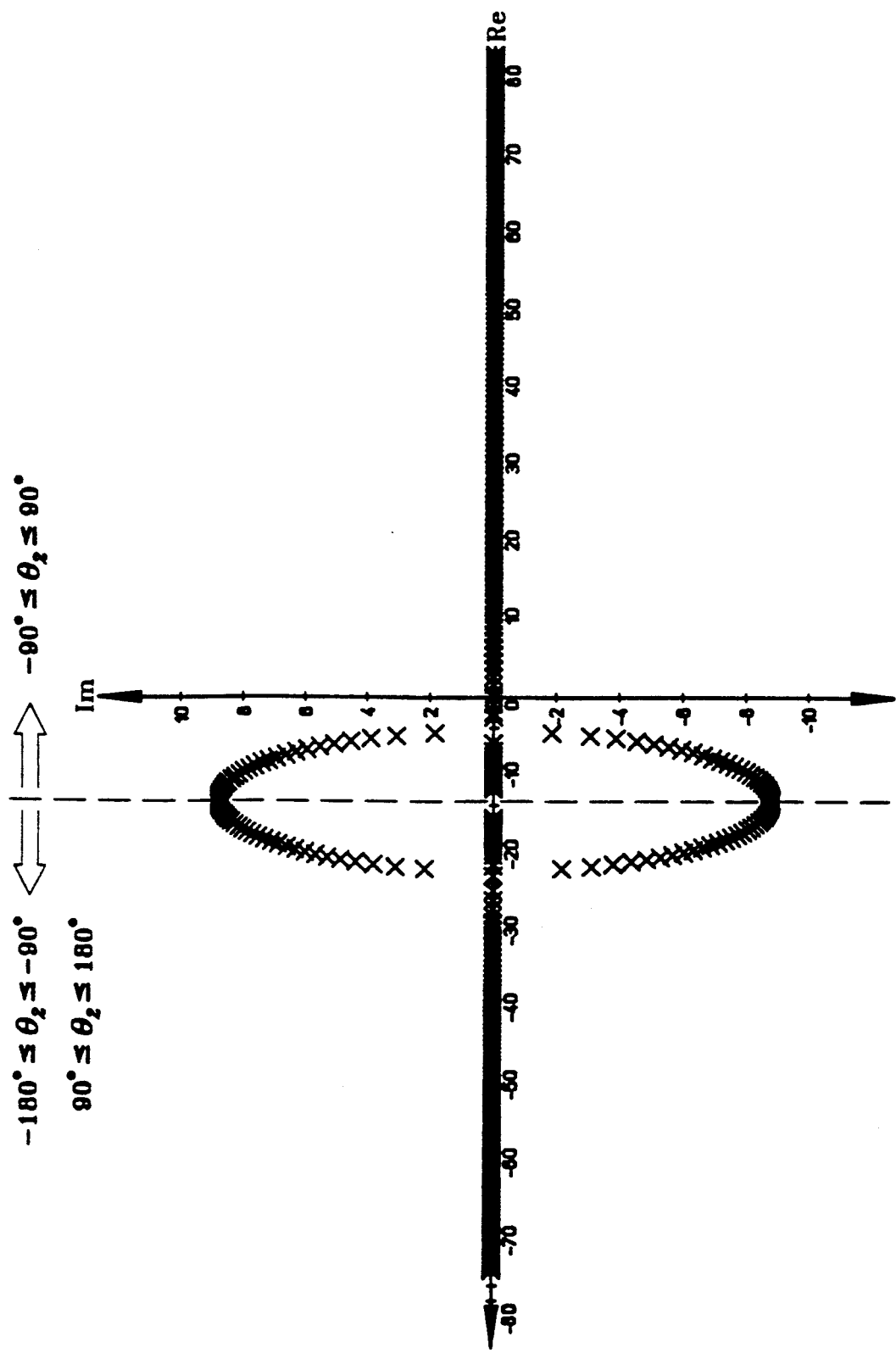
FIG._6

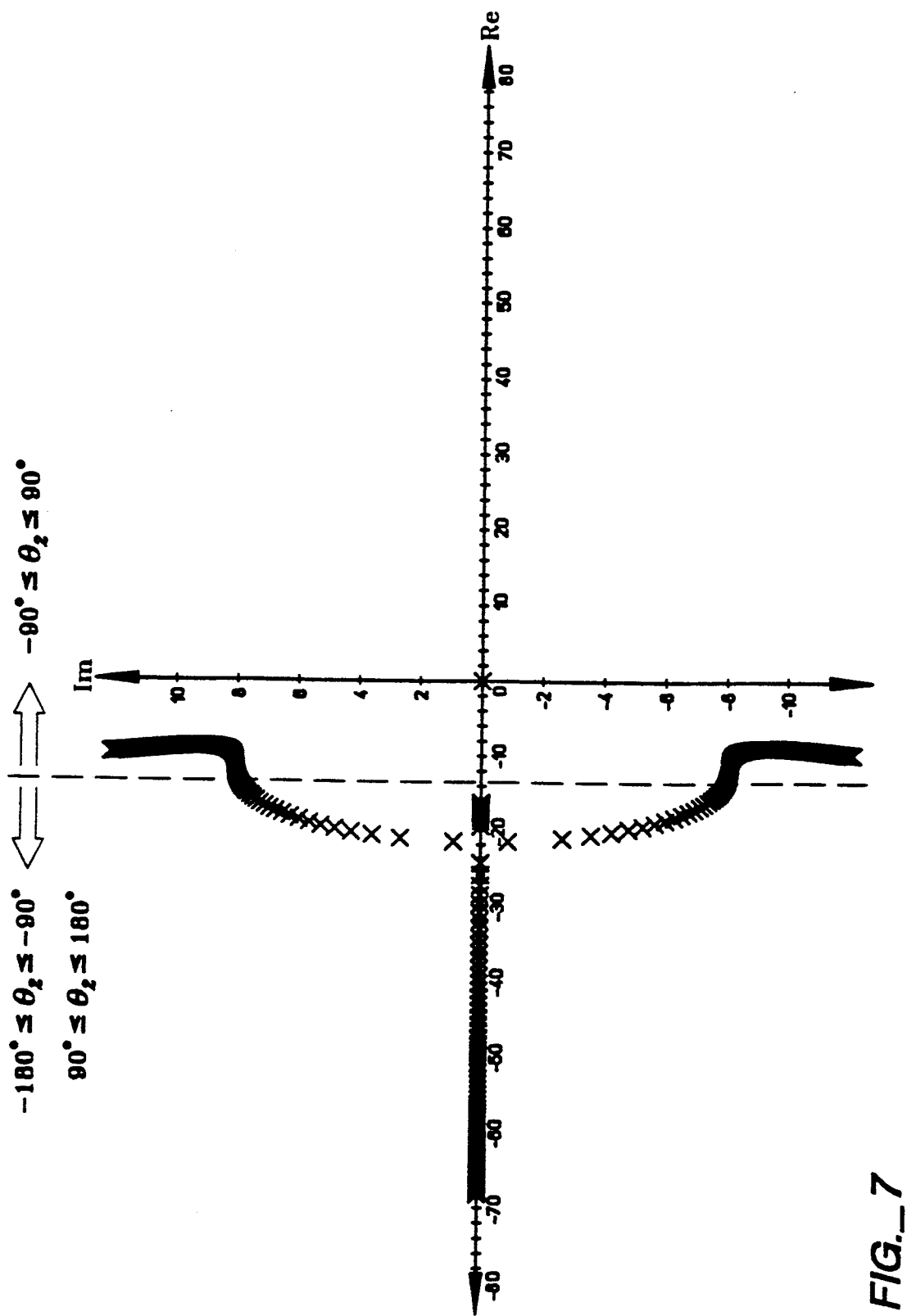
FIG._7

SYSTEM FOR HYBRID POSITION AND FORCE CONTROL

CROSS REFERENCE TO RELATED APPLICATION(S)

This is a continuation of copending application Ser. No. 07/771,583 filed on Oct. 4, 1991, now abandoned, which is a continuation-in-part of copending U.S. patent application Ser. No. 07/682,278, filed Apr. 9, 1991.

BACKGROUND OF THE INVENTION

1. Field of the Invention

The present invention relates generally to robotic control systems and more particularly to hybrid position and force control systems of the kind that are used for controlling robotic manipulators.

2. The Prior Art

Manipulators having end effectors such as robotic "hands" find many uses. For example, such a manipulator might install an electronic component having many leads on a printed circuit board with each lead in the correct hole for soldering. Another might perform a machining operation such as cutting or grinding a workpiece. Manipulators are particularly well suited for performing manual operations in hostile environments such as outer space or a radioactive area of a nuclear reactor where humans cannot readily go. Frequently the operations performed by a manipulator involve interaction with the environment under circumstances requiring great precision both in positioning the end effector and in the amount of force it exerts. Accordingly there has been a need for an efficient and effective means to control the operation of these manipulators.

FIG. 1 provides an example of a typical manipulator generally 100. An end effector such as a robotic hand 101 is rotatingly coupled to a link 103 by a joint 105. The link 103 is pivotingly coupled by a joint 107 to another link 109, and the link 109 in turn is pivotingly coupled by a joint 111 to another link 113. The link 113 is coupled through a joint 115 to an upper vertical link 117. The link 117 is rotatingly and telescopingly coupled by a joint 119 to a lower vertical link 121 which is supported by a base 123. The manipulator is controlled by a controller 125 which typically includes a communication terminal 127 and calculating and memory circuits (not shown).

As shown in cutaway view, motive means such as an electric motor 129 rotates the upper vertical link 117 with respect to the lower vertical link 121 as indicated by an arrow 131. Similarly, other motive means (not shown) such as motors or pneumatic actuators move the various other links in varying ways according to the physical structure of the joints. A sensor such as an optical encoder 133 provides feedback respecting the angular orientation of the link 117 with respect to the link 121. Other sensors (not shown) provide feedback respecting the positions of the various other joints with respect to their associated links or other parts. A sensor such as a strain gage 135 provides feedback respecting the torque being exerted by the upper link 117. Other sensors (not shown) provide similar feedback respecting the forces and torques being exerted by other parts of the manipulator.

The position and orientation of the hand 101 are typically described relative to some convenient coordinate system of interest. For example, for the manipulator 100 it might be convenient to use a fixed Cartesian coordinate system having an origin 137 at a desired location, an x-axis 139 and a y-axis 141 which define a horizontal plane parallel to the base 123, and a vertical z-axis 143 parallel to the vertical link 117. In other applications it might be preferable to use another coordinate system such as spherical or cylindrical or a system in which the origin is not fixed.

The required motion of the end effector of a robotic manipulator is often very complex, and various systems have been proposed for accurately and automatically controlling this motion. One such system, known as a "hybrid" control system, provides unified control of both the displacement of an end effector and the forces exerted thereby (for convenience, the term "displacement" will be used herein to refer to the position and orientation of an end effector).

In general, a hybrid control system controls either displacement or force in any one direction of motion. The main concept is to control force in directions in which it is difficult to control displacement, for example because the geometry is not well defined or is unknown or because a certain contact force is required. Hybrid control systems have functioned satisfactorily in specialized applications, but in general such systems have not provided stable control. This lack of guaranteed stability has limited the applicability and acceptability of hybrid control systems.

FIG. 2 provides a functional block diagram of a prior art hybrid control system as proposed by Craig, J. J., and M. H. Raibert in "A Systematic Method of Hybrid Position/Force Control of a Manipulator", Computer Software and Applications Conference, IEEE Computer Society, November 1979, Chicago, Ill., pages 446-451. The purpose of this control system is to control both the displacement of, and the force applied by, an end effector of a manipulator 11. It will be understood that the manipulator 11 may represent any of a number of different kinds of manipulators, of which the manipulator 100 shown in FIG. 1 is merely exemplary. Similarly, the manipulator 11 may have any of various kinds of end effectors. The nearly symmetrical upper and lower halves of FIG. 2 depict displacement and force control portions, respectively, of the hybrid control system.

In the upper half of FIG. 2, a summing node 13 receives a desired displacement vector $x_d$ that represents a desired displacement of the end effector of the manipulator 11 and an actual displacement vector $x_a$ that represents the actual displacement thereof. As indicated above, each of these displacement vectors represents both position and orientation of the end effector and therefore typically is a six-element vector. In some applications less than six elements may be required; for example, in the case of an end effector that moves entirely in a plane, a three-element vector giving x and y coordinates and a single orientation value would be sufficient.

In some situations it may be desirable to enhance system performance by further describing the motion of the end effector, for example by means of one or more other vectors such as velocity and acceleration in addition to the displacement vector.

In any given situation, particular values of the elements of the desired displacement vector $x_d$ are provided by a user or may be calculated by a computer or the like. The values of the elements of the actual displacement vector $x_a$ are derived from signals provided by sensors such as those discussed with reference to the manipulator 100 that detect the actual positions and orientations of the various joints of the manipulator or of the end effector itself.

The summing node 13 algebraically combines the actual and desired displacement vectors $x_a$ and $x_d$ and produces an end effector displacement error vector $x_e$ indicative of any difference; that is, $$x_e = x_d - x_a.$$

Control signals are derived from $x_e$ and are used to move the end effector toward its desired position and orientation, as will be explained in more detail shortly.

Similarly, in the lower half of FIG. 2 a summing node 15 receives a desired force vector $f_d$ that represents a desired force to be exerted by the end effector of the manipulator 11 and an actual force vector $f_a$ that represents the actual force exerted by the end effector. These force vectors actually represent both force and moment information and therefore, like the displacement vectors, they typically have six elements.

Particular values of the elements of the vectors $f_d$ and $f_a$ are determined in a similar manner to that which is used to determine values of the elements of the vectors $x_d$ and $x_a$, respectively.

The summing node 15 algebraically combines the actual and desired force vectors $f_a$ and $f_d$ and produces an end effector force error vector $f_e$ indicative of any difference, in a manner analogous to the determination of the end effector displacement error vector $x_e$ as previously described. Control signals are derived from $f_e$ and are used to cause the end effector to exert the desired force.

The method by which the end effector displacement and force error vectors $x_e$ and $f_e$ are used to generate the control signals will now be described in more detail.

It will be necessary to select those terms of $x_e$ that correspond to axes along which the displacement of, and not the force exerted by, the end effector is to be controlled. As indicated by a function block 17, this selection is accomplished by means of a diagonal selection matrix (designated S).

Each diagonal element of the selection matrix S has a value of either one or zero. A value of one indicates an axis along which displacement is to be controlled, whereas a value of zero indicates an axis along which displacement is not to be controlled. The matrix S is typically a 6×6 diagonal matrix.

The vector $x_e$ is multiplied by the matrix S to obtain a selected end effector displacement error vector $x_{es}$ as follows:

$$x_{es} = S x_e \qquad (1)$$

The vector $x_{es}$ must be converted into values representative of displacements of the various joints of the manipulator. As indicated by a function block 19, this conversion is accomplished by means of an inverse of a certain matrix known as the Jacobian matrix.

The Jacobian matrix (designated J) is a first order approximation of a function that maps differential motions of the joints of a manipulator, represented by a joint displacement error vector $\theta_e$, into differential motions of the end effector in terms of the coordinate system of interest. The differential motions of the end effector, of course, are represented by the end effector displacement error vector $x_e$. This mapping is expressed in the following linearized relationship:

$$x_e = J \theta_e \qquad (2)$$

The vector $\theta_e$ has one element associated with each joint; if the robot has n joints then the vector $\theta_e$ is an n-element vector. The derivation of the Jacobian matrix J is given, for example, in Paul, R. P., Robot Manipulators: Mathematics, Programming and Control, MIT Press, 1981.

If the vector $\theta_e$ is already known, then the vector $x_e$ may be calculated according to Eq. (2). But in the present situation the vector $x_e$ is known and it is desired to calculate the vector $\theta_e$; therefore, what is required is an inverse of the mapping provided by the matrix J. A unique inverse mapping exists if J is a square matrix of maximal rank, in which event a joint displacement error vector $\theta_e$ may be calculated from the end effector displacement error vector $x_e$ as follows:

$$\theta_e = J^{-1} x_e \qquad (3)$$

Eq. (3) has been used in an attempt to compute a desired selected joint displacement error vector $\theta_{es}$ from the selected end effector displacement error vector $x_{es}$ as determined in Eq. (1) as follows:

$$\theta_{es} = J^{-1} x_{es} \qquad (4)$$

However, calculating the selected joint displacement error vector $\theta_{es}$ in this manner can result in instability and therefore limits the usefulness of the hybrid control system.

It will be apparent to those skilled in the art that if J is not square, the pseudo-inverse $J^+$ would be used in Eqs. (3) and (4) in place of the inverse $J^{-1}$. For simplicity, the term $J^{-1}$ will be used herein to denote the inverse of J if J is square and the pseudo-inverse of J if J is not square.

When the selected joint displacement error vector $\theta_{es}$ has been computed, it is used to calculate elements of a position-correcting torque vector $\tau_p$ as indicated by a "position control law" function block 21. The vector $\tau_p$ represents control signals to be applied to the motive means of the joints to cause the end effector to move to the desired position and orientation.

The position control law typically is a linear differential equation, but it could be any function that operates upon an input vector to produce a unique output. In practice, the control law is often a P-I-D (proportional, integral, differential) control law, although an adaptive or other type of control law could be used instead.

Analogously to selecting terms of $x_e$ corresponding to axes along which the position of the end effector is to be controlled, terms of the end effector force error vector $f_e$ corresponding to axes along which the force exerted by the end effector is to be controlled must also be selected. This selection is accomplished by means of the matrix I-S (where I is the identity matrix) as indicated by a function block 23. The matrix I-S is the orthogonal complement of the selection matrix S.

Each diagonal element of the matrix I-S has a value of either one or zero. A value of one indicates an axis along which force is to be controlled, whereas a value of zero indicates an axis along which force is not to be controlled. In the embodiment being described, this matrix typically is a 6×6 diagonal matrix. Force control is orthogonal to position control and therefore the mathematical definition is $$S^\perp = I - S.$$

It should be understood that the zeros in the diagonal of S correspond with the ones in the diagonal of $S^\perp$ and vice versa.

The vector $f_e$ is multiplied by the matrix $S^\perp$ to obtain a selected end effector force error vector $f_{es}$ as follows:

$$f_{es} = S^\perp f_e$$

The values of the end effector selected force error vector $f_{es}$ must be converted into torques to be exerted by the various joints. This is done by means of $J^T$, the transpose of the Jacobian matrix J, according to the following relation:

$$\tau_e = J^T f_e.$$

The preceding equation, unlike Eq. (3), is not an approximation and therefore is correct for any J and f. It follows that a desired joint force error vector $\tau_{es}$ may be calculated according to the following relation:

$$\tau_{es} = J^T f_{es}$$

as indicated by a function block 25, without introducing any instability into the system.

After the joint force error vector $\tau_{es}$ has been computed, it is used to calculate elements of a force-correcting torque vector $\tau_f$ as indicated by a "force control law" function block 27. The vector $\tau_f$ represents control signals to be applied to the motive means of the joints to cause the end effector to exert the desired force.

Finally, the position-correcting torque vector $\tau_p$ and the force-correcting torque vector $\tau_f$ are algebraically combined, as indicated by a summing node 29, to produce a final set of control signals that are applied to the motive means associated with the various joints of the manipulator so as to cause the end effector to move to the desired position and orientation and to exert the desired force and moment.

FIG. 2 shows a typical means to calculate the actual displacement and force vectors $x_a$ and $f_a$. Displacements of the various joints as measured by sensors are represented by a joint vector $\theta_a$. The actual displacement vector $x_a$ is computed from the joint vector $\theta_a$ according to a forward kinematics equation as indicated by a function block 31. Similarly, as indicated by a function block 33, the actual force vector $f_a$ is computed from the measured forces $f_h$ such as those measured by the sensors at the various joints by means of a force transform equation.

The hybrid control system as described above is typical of various kinds of hybrid control systems that have been proposed. Although these systems have functioned satisfactorily in some special applications, in general they can become unstable for certain combinations of S and $J^{-1}$. That is, an infinite (or near-infinite) or unbounded oscillatory position-correcting torque vector $\tau_p$ may be produced in response to finite values of $x_{es}$. This potential for unstable operation has limited the applicability and acceptability of hybrid position and force control systems. Accordingly there is a need for a way to realize a stable hybrid control system for a robotic manipulator.

SUMMARY OF THE INVENTION

The present invention provides a stable hybrid control system for controlling displacement and force of an end effector of a robotic manipulator. In addition, the invention provides a simple and effective means for tuning the control system. The invention can readily be used with existing robotic systems.

In a preferred embodiment of a hybrid control system according to the invention, an end effector displacement error signal is multiplied by a pseudo-inverse of a matrix product of a selection matrix and a Jacobian matrix to produce a selected joint displacement error signal. This joint displacement error signal and a joint force error signal are combined to produce a control signal which causes the end effector to move in accordance with the desired displacement and to exert the desired force.

The end effector displacement error signal is typically obtained by calculating any difference between a signal indicating the actual displacement of the end effector and a signal indicating the desired displacement. Similarly, an end effector force error signal is obtained by calculating the difference between an actual force exerted by the end effector and a desired force, and the joint force error signal in turn is calculated from the end effector force error signal.

Another preferred embodiment of the invention includes means for providing a joint tuning signal by, for example, multiplying an input tuning signal by a matrix difference between an identity matrix and a matrix product of a pseudo-inverse of the Jacobian matrix and the Jacobian matrix. The joint tuning signal is used to tune the system, for example to prevent any part of the manipulator from striking a nearby obstacle. Preferably separate displacement and force components of the tuning signal are provided to tune both the joint displacement error signal and the joint force error signal.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 2 is a functional block diagram of a prior art hybrid control system for controlling a manipulator such as that depicted in FIG. 1;

FIG. 3 is a functional block diagram of a hybrid control system according to the present invention;

FIG. 4 is a functional block diagram of a tunable hybrid control system according to the present invention;

FIG. 5 is a graph showing the sufficient stability test as applied to a hybrid control system according to the prior art as shown in FIG. 2 and to a system according to the invention as shown in FIG. 3;

FIG. 6 is a graph showing an unstable root locus plot of a system of the kind shown in FIG. 2; and FIG. 7 is a graph showing a stable root locus plot of a system according to the invention as shown in FIG. 3.

DESCRIPTION OF THE PREFERRED EMBODIMENT

Figure 1:
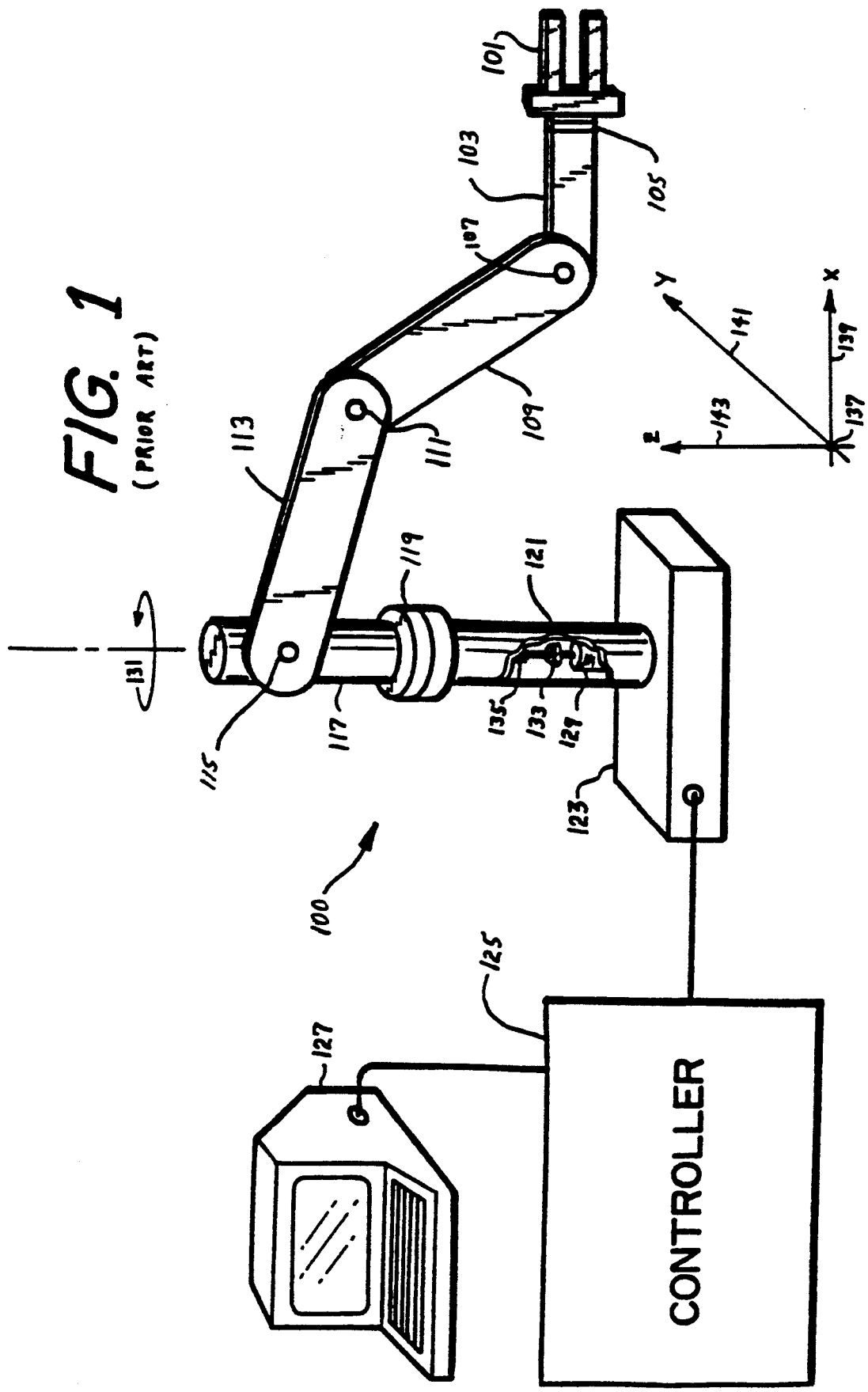
FIG. 1 is a perspective view of a robotic manipulator according to the prior art.

As shown in the drawings for purposes of illustration, the invention is embodied in a novel hybrid control system for a robotic manipulator. A system according to the invention provides stable, tunable control of the manipulator. Existing hybrid control systems have not been able to provide stable control except under limited circumstances.

In a preferred embodiment of a stable hybrid control system according to the invention, an end effector displacement error signal is multiplied by a pseudo-inverse of a matrix product of a selection matrix and a Jacobian matrix to provide a selected joint displacement error signal. The term "selection matrix" as used herein is meant to include any projection matrix, of which the diagonal selection matrix as defined previously is one example. This joint displacement error signal and a joint force error signal are combined to provide a control signal which causes the end effector to move in accordance with the desired displacement and to exert the desired force.

In another preferred embodiment of the invention, an input tuning signal is multiplied by a matrix difference between an identity matrix and a matrix product of a pseudo-inverse of the Jacobian matrix and the Jacobian matrix to provide a joint tuning signal.

A preferred embodiment of a hybrid control system according to the invention is shown in FIG. 3. Some of the elements of this system are similar to elements of the prior art system as shown in FIG. 2, and for convenience such elements have been assigned the same reference numerals.

The system as shown in FIG. 3 includes means such as the summing node 13 for providing an end effector displacement error signal $x_e$ indicative of any difference between an actual displacement $x_a$ of an end effector of the robotic manipulator 11 and a desired displacement $x_d$ thereof; means 35 for calculating a joint displacement error signal $\theta_{es}$ by multiplying the end effector displacement error signal by a pseudo-inverse of a matrix product of a selection matrix S and a Jacobian matrix J; means such as the summing node 15 for providing an end effector force error signal $f_e$ indicative of any difference between an actual force $f_a$ exerted by the end effector and a desired force $f_d$ to be exerted thereby; means 37 for calculating a joint force error signal $\tau_{es}$ from the end effector force error signal; and control signal means such as the summing node 29 responsive to the joint displacement error signal and the joint force error signal to provide a control signal for causing the end effector to move in accordance with the desired displacement and to exert the desired force.

The system preferably includes means as indicated by the function block 21 for calculating a position-correcting torque signal $\tau_p$ from the joint displacement error signal according to a position control law and means as indicated by the function block 27 for calculating a force-correcting torque signal $\tau_f$ from the joint force error signal according to a force control law. The summing node 29 algebraically combines these two torque signals to provide the control signal.

Preferably the system includes first feedback means as indicated by the function block 31 responsive to a signal $\theta_a$ indicative of the actual displacements of the manipulator joints to provide the end effector actual displacement signal, and second feedback means as indicated by the function block 33 responsive to a signal $f_h$ indicative of forces such as those at the manipulator joints to provide the end effector actual force signal.

A preferred embodiment of a tunable hybrid control system according to the invention is shown in FIG. 4.

This system is in some respects similar to the system shown in FIG. 3, and for convenience, similar elements are assigned similar reference numerals and will not be further discussed.

The tunable hybrid control system as shown in FIG. 4 includes means such as a pair of function blocks 41 and 43 for providing a joint tuning signal. More particularly, the function block 41 comprises means for calculating a displacement component of the joint tuning signal by multiplying an input displacement tuning signal $z_\theta$ by a matrix difference between the identity matrix I and a matrix product of the pseudo-inverse $J^+$ of the Jacobian matrix and the Jacobian matrix J. The input signal $z_\theta$ may be provided by a user, calculated by a computer, or the like.

In a similar manner, the function block 43 comprises means for calculating a force component of the joint tuning signal by multiplying an input force tuning signal $z_\tau$ by the matrix difference between the identity matrix and the matrix product of the pseudo-inverse of the Jacobian matrix and the Jacobian matrix.

A summing node 45 combines the displacement component of the joint tuning signal with the joint displacement error signal to tune the displacement of the manipulator. Similarly a summing node 47 combines the force component of the joint tuning signal with the joint force error signal to tune the force exerted by the manipulator.

Some particular systems may not require tuning both the displacement and the force. For example, if it were desired to tune only the displacement of the manipulator, the function block 43 and the summing node 47 would be omitted such that the force exerted by the manipulator would not be tuned.

The mathematical basis for the invention will now be described in more detail.

The instability of a hybrid control system according to the prior art resides in the displacement part of the system, as has been discussed previously with respect to Eqs. (1) through (4), the calculations of which are represented by the function blocks 17 and 19 of FIG. 2. These equations are restated here for convenience:

$$x_{es} = Sx_e \tag{1}$$

$$x_e = J\theta_e \tag{2}$$

$$\theta_e = J^{-1}x_e \tag{3}$$

$$\theta_{es} = J^{-1}x_{es} \tag{4}$$

In particular, the derivation in Eq. (4) is an incorrect solution and leads to instability. A fundamental assumption that the Jacobian matrix J is of maximal rank is made implicitly when its inverse $J^{-1}$ is used in Eq. (3) to map the end effector displacement error vector $x_e$ to the joint displacement error vector $\theta_e$.

The displacement error vector which is of interest in the hybrid control scheme is $x_{es}$, and Eq. (4), which obtains $\theta_{es}$ from $x_{es}$, assumes that Eqs. (1) and (2) are two independent mappings. Actually, when Eqs. (1) and (2) are combined, the result is $$Sx_e = (SJ)\theta_e. \tag{5}$$

The significance of this result is that S is a projection matrix that reduces the space on the left side of Eq. (5) whereas SJ maps a redundant number of manipulator joints onto that reduced space on the right side. In the general case this means that there are more joints than necessary to satisfy the displacement constraints of the end effector. Accordingly, the implicit assumption (that J is of maximal rank) that accompanies the use of $J^{-1}$ in Eq. (3) is not valid in the general case.

Substituting Eq. (1) into Eq. (5) yields the correct relationship between the selected end effector displacement error and the joint displacement error as follows:

$$x_{es} = (SJ)\theta_e \qquad (6)$$

It should be noted that SJ is a singular matrix and does not have an inverse.

The general solution of Eq. (6) for the selected joint displacement error vector is:

$$\theta_{es} = (SJ)^+ x_{es} + [I - (SJ)^+(SJ)]z \qquad (7)$$

where
- $(SJ)^+$ is the pseudo-inverse of (SJ) and
- z is an arbitrary vector in the manipulator joint space.

The pseudo-inverse is discussed in Strang, G., Linear Algebra and Its Applications (2nd Ed.), Academic Press, 1980. It should be obvious that the original position solution for $\theta_{es}$ as computed in Eq. (4) will not always produce the same result as the solution of Eq. (7). Eq. (7) will be referred to herein as the general position solution for $\theta_{es}$.

To fully appreciate the relationship between the general position solution for $\theta_{es}$ as given by Eq. (7) and the solution as given by Eq. (4), the properties of projection matrices for linear systems will be used. These properties are discussed in more detail in Halmos, P. R., Finite-Dimensional Vector Spaces, Springer-Verlag, 1974.

The joint displacement error vector $\theta_{es}$ may be projected into the sum of two orthogonal vectors using the (SJ) transformation matrix from Eq. (6) as follows:

$$\theta_{es} = (SJ)^+(SJ)\theta_{es} + [I - (SJ)^+(SJ)]\theta_{es} \qquad (8)$$

where $(SJ)^+(SJ)$ and $[I - (SJ)^+(SJ)]$ are the joint space projection matrices for the system. Substituting the solution for $\theta_{es}$ from Eq. (4) into Eq. (8) yields $$J^{-1}x_{es} = (SJ)^+(SJ)J^{-1}x_{es} + [I - (SJ)^+(SJ)]J^{-1}x_{es} \qquad (9)$$

The projected vector $(SJ)^+(SJ) J^{-1}x_{es}$ may be simplified by using the relations $$JJ^{-1} = I$$

and $$Sx_{es} = x_{es}$$

to obtain $$J^{-1}x_{es} = (SJ)^+ x_{es} + [I - (SJ)^+(SJ)]J^{-1}x_{es} \qquad (10)$$

It is important to note that the first projection term in Eq. (10) is the minimum norm solution part of the general form of $\theta_{es}$ as given by Eq. (7). Eq. (10) explicitly shows that the traditional approach of using the inverse of the Jacobian matrix to solve for $\theta_{es}$ by means of Eq. (4) will inadvertently add an orthogonal vector $[I - (SJ)^+(SJ)] J^{-1}x_{es}$ to the minimum norm solution. For the general position solution as given by Eq. (7) to behave the same as the solution given by Eq. (4), compare the orthogonal projection terms in Eqs. (10) and (7) to immediately see that one obvious choice for the arbitrary vector z would be:

$$z = J^{-1}x_{es} \qquad (11)$$

The kinematic instability in a hybrid control system of the prior art is caused by the projection of z as given by Eq. (11) onto the null space of (SJ).

It might be argued that the orthogonal vector $[I - (SJ)^+(SJ)]$ z in Eq. (7) adds flexibility to the solution for $\theta_{es}$ and might be used to optimize $\theta_{es}$ based on some desired criterion (e.g., minimizing joint energy or keeping the joints in the middle of their operating range). It is important to keep in mind that the general position solution of Eq. (7) was derived without taking into account the rest of the hybrid control scheme. The orthogonal vector contribution is from the joint space that is not available to the minimum norm solution, which is the space potentially used by the force control part of the formulation. To avoid any conflicts with the force part of the hybrid control scheme, the arbitrary vector z will be assumed to be zero such that Eq. (7) reduces to the following minimum norm solution:

$$\theta_{es} = (SJ)^+ x_{es} \qquad (12)$$

This minimum norm solution guarantees that the linear transformation from the selected end effector displacement vector $x_{es}$ to the joint displacement error vector $\theta_{es}$ will never generate a vector that would be considered in the opposite direction to the joint error vector $\theta_e$ when $S = I$ and will never cause an increase in the joint error vector norm. Thus the system will always be kinematically stable, as will be shown later.

This minimum norm solution for $\theta_{es}$ as given by Eq. (12) is implemented in the first embodiment of the invention as described above and illustrated in FIG. 3. It will be noted that the transformation from $x_e$ to $x_{es}$ as given by Eq. (1) is not shown in FIG. 3. As described in Noble, B., "Methods for Computing the Moore-Penrose Generalized Inverse, and Related Matters," Generalized Inverses and Applications (M. Z. Nashed, ed.), Academic Press, 1976, pp. 245-302, it can be shown that both $(SJ)^+ S$ and $(SJ)^+$ satisfy the four Moore-Penrose properties of a pseudoinverse. Because the pseudoinverse of a matrix is unique, it follows that $$(SJ)^+ S = (SJ)^+$$

Thus, from Eq. (12), $$\theta_{es} = (SJ)^+ x_{es} = (SJ)^+ S x_e = (SJ)^+ x_e$$

It will also be noted that the function blocks 23 and 25 of FIG. 2 have been replaced by the function block 37 in FIG. 3. The block 37 is equivalent to the blocks 23 and 25, and the change was made only to maintain symmetry in the drawing. The two blocks 23 and 25, which represent matrix transformations for mapping end effector forces to joint torques, have been combined into the one equivalent block 37 as shown in FIG. 3 by means of standard matrix algebra operations.

A sufficient condition for system stability using just the kinematic information will now be discussed. The stability of a system is determined by the interaction among the kinematics, dynamics, and the control law. The critical issue is how the selection matrix influences system stability. The system is assumed to be stable when in pure position control (that is, when $S=I$) so that the $\theta_e$'s corresponding to the $x_e$'s under these normal conditions do not produce any system instabilities. The purpose of the selection matrix is not to stabilize an inherently unstable system or to cause an inherently stable system to become unstable. The issue then becomes one of comparing the joint displacement error vector $\theta_{es}$ as calculated for any arbitrary selection matrix $S$ with a stable joint displacement error vector $\theta_e$ that would have been calculated under conditions of pure position control where $S=I$. This is done by defining the following sufficient condition for system stability using inner products of the joint error vectors as $$0 \leq \theta_e^T \theta_{es} \leq \theta_e^T \theta_e, \forall \theta_e \quad (13)$$

where $\forall$ means "for all".

It is important to note that both $\theta_e$ and $\theta_{es}$ are computed using the same end effector displacement error vector $x_e$, thereby making any solution for $\theta_{es}$ always related to $\theta_e$. The lower bound in Inequality (13) means that the projection of $\theta_{es}$ onto $\theta_e$ cannot be in the opposite direction of $\theta_e$, thereby eliminating any potentially unstable conditions of introducing positive feedback into the system. The upper bound in Inequality (13) means that the projection of $\theta_{es}$ onto $\theta_e$ cannot be larger than $\theta_e$, so that the end effector will not overshoot its destinations and cause uncontrollable system oscillations. The system may still be stable when the value of $\theta_e^T \theta_{es}$ is outside the bounds of Inequality (13); determining how far outside the bounds this value can be before the system becomes unstable is not straightforward, and it must be remembered that Inequality (13) is only a sufficient, not a necessary, condition for system stability.

To determine the relationship between $\theta_e$ and $\theta_{es}$ for the embodiment shown in FIG. 3, Eqs. (12) and (6) are combined to get $$\theta_{es} = (SJ)^+ (SJ)\theta_e \quad (14)$$

$(SJ)^+(SJ)$ is a projection matrix (see Halmos) and therefore satisfies the definition of a positive semidefinite matrix (see Strang), and therefore the following quadratic expression $$\theta_e^T (SJ)^+ (SJ) \theta_e \leq 0 \quad (15)$$

is true for all vectors $\theta_e$. When $\theta_{es}$ in Eq. (14) is substituted into Inequality (13), the inner product is exactly Inequality (15) and therefore the minimum norm solution for $\theta_{es}$ will always satisfy the lower bound of Inequality (13).

Another property of a projection matrix is that the norm of a projected vector is bounded by the norm of the original vector. This means that the norm of $\theta_{es}$ given by Eq. (14) is bounded by $$\| (SJ)^+ (SJ) \theta_e \| \leq \| \theta_e \| \quad (16)$$

and therefore the upper bound in Inequality (13) is satisfied for all $\theta_e$ when using the minimum norm solution for $\theta_{es}$. This proves that the minimum norm solution for $\theta_{es}$ in Eq. (12) will always satisfy the sufficient condition for system stability as defined in Inequality (13).

In the prior art hybrid control system as shown in FIG. 2, the relationship between $\theta_e$ and $\theta_{es}$ is easily determined by combining Eqs. (1), (2) and (4) to get $$\theta_{es} = (J^{-1} SJ) \theta_e \quad (17)$$

An, C. J. and J. M. Hollerbach, "Kinematic Stability Issues in Force Control of Manipulators," International Conference on Robotics and Automation, IEEE Robotics and Automation Society, Raleigh, N.C., pp. 897–903, April 1987, show by example that the position part of the system could become unstable and that the cause was somehow related to the interaction between the kinematic $J^{-1}$ SJ transformation matrix and the system inertia matrix. An et al. used a linear state space model of the position part of the system to test for the instability by doing a root locus plot of varying manipulator configurations. In fact, it is the $J^{-1}$ SJ term that causes the system poles to migrate into the unstable right half plane for various end effector motions.

By using the same example it will be shown that the $J^{-1}$ SJ term is responsible for causing an unstable system when applying the sufficient condition test in Inequality (13). In "Case 2" of An et al., $S = \text{diag}[0, 1]$ and the Jacobian matrix for the two revolute joint manipulators was given as $$J = \begin{bmatrix} -l_1 s_1 - l_2 s_{12} & -l_2 s_{12} \\ l_1 c_1 + l_2 c_{12} & l_2 c_{12} \end{bmatrix} \quad (18)$$

where
$S_i = \sin(\theta_i)$,
$C_i = \cos(\theta_i)$,
$S_{12} = \sin(\theta_1 + \theta_2)$ and
$C_{12} = \cos(\theta_1 + \theta_2)$.

The link lengths were
$l_1 = 0.462$ m and
$l_2 = 0.4445$ m.

The inner product of $\theta_e$ with $\theta_{es}$ using Eq. (17) is $\theta_e^T (J^{-1} SJ) \theta_e$. To test this inner product against the bounds set forth by the sufficiency condition of Inequality (13), we will consider the situation where $\theta_1 = 0°$ and $\theta_2$ varies from $-180°$ to $180°$ with $$\theta_e = [0, \pm 1]^T$$

A plot of the result is shown by a solid line 51 in FIG. 5.

For comparison, a plot of the inner product using the minimum norm solution for $\theta_{es}$ according to the invention is shown by a dashed line 53 in FIG. 5. As FIG. 5 shows, the prior art solution for $\theta_{es}$ violates the sufficiency condition for system stability when $$\| \theta_2 \| \leq 90°$$

whereas the solution for $\theta_{es}$ according to the invention is always stable.

A point 55, marked with an "x" in FIG. 5, was identified by An et al. as indicating a value of $\theta_2$ at which the system actually transitions from the stable region to the unstable region, the system actually being unstable only for values of $\theta_2$ that are less than the value x. Even though the inner product is negative for values of $\theta_2$ from x to 90°, the system is still stable for such values of $\theta_2$. Recall that the sufficiency condition in Inequality (13) does not imply the system will be unstable for values outside the stated bounds; it only indicates that an unstable situation could occur.

According to An et al., a closed-loop system described as $$\delta \dot{x} = \begin{bmatrix} 0 & 1 \\ -M^{-1}K_p J^{-1}SJ & -M^{-1}K_v J^{-1}SJ \end{bmatrix} \delta x \quad (19)$$

must have negative real parts for the eigenvalues of the matrix to guarantee local stability at the equilibrium points. The inertia matrix was $$M = \begin{bmatrix} m_{11} & m_{12} \\ m_{21} & m_{22} \end{bmatrix}$$

where
$m_{11} = I_1 + I_2 + m_2 l_1 l_2 c_2 + \frac{1}{4}(m_1 l_1^2 + m_2 l_2^2) + m_2 l_1^2$
$m_{12} = m_{21} = I_2 + \frac{1}{4} m_2 l_2^2 + \frac{1}{2} m_2 l_1 l_2 c_2$
$m_{22} = I_2 + \frac{1}{4} m_2 l_2^2$ The inertia values were
$I_1 = 8.095$ kg·m² and
$I_2 = 0.253$ kg·m².

The mass values were
$m_1 = 120.1$ kg and
$m_2 = 2.104$ kg.

To maintain a stable system under normal conditions the gain matrices were chosen as
$K_p$ = diag [2500, 400] and
$K_v$ = diag [300, 30].

A root locus plot of Eq. (19) with $\theta_1 = 0°$ and $\theta_2$ varying from $-180°$ to $180°$ is shown in FIG. 6. The singularity points have been removed. The transition of the system poles into the unstable right half-plane occurs at approximately $\theta_2 = 79°$. This root locus plot confirms the assertion that calculating $\theta_{es}$ according to the prior art can cause the system to become unstable when the sufficiency condition of Inequality (13) is negative.

By comparison, a similar root locus plot of Eq. (19) with the $J^{-1}SJ$ term replaced with $(SJ)^+(SJ)$ from Eq. (14) is shown in FIG. 7. There are no roots in the unstable right half plane for any value of $\theta_2$.

The mathematical basis for the tuned hybrid control system as shown in FIG. 4 will now be discussed. In the embodiment of FIG. 4, provisions are made for tuning both the displacement and force control portions of the system. However, as has been discussed above, in some embodiments it may be desired to tune only one portion of the system. Accordingly, it should be understood that some systems may include provisions for tuning only the displacement or only the force portion rather than both.

In the system as shown in FIG. 4, the solution for $\theta_{es}$ as embodied in the block 35 and expressed mathematically as $$\theta_{es} = (SJ)^+ X_e \quad (20)$$

is combined in the summing node 45 with an additional term from the null space of J, resulting in $$\theta_{es} = (SJ)^+ X_e + [I - J^+ J] z_\theta \quad (21)$$

where $z_\theta$, the joint displacement tuning vector, is a vector in the manipulator joint space. This generalized form of the joint displacement error vector $\theta_{es}$ allows for tuning the displacements of the various joints as desired, for example to avoid obstacles.

Similarly, the solution for $\tau_{es}$ as embodied in block 37 and expressed mathematically as $$\tau_{es} = (S^\perp J)^T f_e \quad (22)$$

is combined with an additional term from the null space of J, resulting in $$\tau_{es} = (S^\perp J)^T f_e + [I - J^+ J] z_\tau \quad (23)$$

where $z_\tau$, the joint force tuning vector, is a vector in the manipulator joint space. This generalized form of the joint force error vector $\tau_{es}$ allows for a redistribution of the joint torques based on joint capabilities.

The system as shown in FIG. 4 directly takes into account the additional flexibility of redundant joints in the control scheme and eliminates ever having to use the inverse of the Jacobian matrix. The $(SJ)^+$ and $(S^\perp J)^T$ transformations always exist and are numerically stable for any manipulator. Of course, it will be apparent that a specialized hybrid control system which does not utilize these transformations but which has been found to be stable could also be tuned according to the principles of the invention to provide an improved, tunable control system.

From the foregoing it will be appreciated that the hybrid control system provided by the present invention represents a significant advance in the art. The present invention provides a way to control a robotic manipulator with assured stability. Furthermore, the system may be tuned as desired, for example for obstacle avoidance.

Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

We claim:

1. A hybrid control system comprising:
   means for providing an end effector displacement error signal indicative of any difference between an actual displacement of an end effector of a robotic manipulator and a desired displacement thereof;
   means for calculating a selected joint displacement error signal by multiplying the end effector displacement error signal by a pseudo-inverse of a matrix product of a selection matrix and a Jacobian matrix;
   means for providing an end effector force error signal indicative of any difference between an actual force exerted by the end effector and a desired force to be exerted thereby;
   means for calculating a selected joint force error signal from the end effector force error signal; and
   control signal means responsive to the joint displacement error signal and the joint force error signal to provide a control signal for causing the end effector to move in accordance with the desired displacement and to exert the desired force.

2. A control system as in claim 1 and further comprising means for providing a joint tuning signal, the control signal means being responsive to the joint tuning signal to provide the control signal.

3. A hybrid control system comprising:
- means for providing an end effector displacement error signal indicative of any difference between an actual displacement of an end effector of a robotic manipulator and a desired displacement thereof;
- means for calculating a selected joint displacement error signal from the end effector displacement error signal;
- means for providing an end effector force error signal indicative of any difference between an actual force exerted by the end effector and a desired force to be exerted thereby;
- means for calculating a selected joint force error signal from the end effector force error signal;
- means for providing a joint tuning signal, the means for providing the joint tuning signal comprising means for calculating a displacement component of the tuning signal by multiplying an input displacement tuning signal by a matrix difference between an identity matrix and a matrix product of a pseudo-inverse of a Jacobian matrix and the Jacobian matrix; and
- control signal means responsive to the joint displacement error signal, the joint force error signal and the tuning signal to provide a control signal for causing the end effector to move in accordance with the desired displacement and to exert the desired force.

4. A control system as in claim 3 wherein the means for providing the joint tuning signal comprises means for calculating a force component of the tuning signal by multiplying an input force tuning signal by a matrix difference between an identity matrix and a matrix product of a pseudo-inverse of the Jacobian matrix and the Jacobian matrix.

5. A control system as in claim 4 wherein the means for calculating the joint displacement error signal comprises means for multiplying the end effector displacement error signal by a pseudo-inverse of a matrix product of a selection matrix and the Jacobian matrix.

6. A control system as in claim 3 wherein the means for calculating the joint displacement error signal comprises means for multiplying the end effector displacement error signal by a pseudo-inverse of a matrix product of a selection matrix and the Jacobian matrix.

7. A hybrid control system comprising:
- means for providing an end effector displacement error signal indicative of any difference between an actual displacement of an end effector of a robotic manipulator and a desired displacement thereof;
- means for calculating a selected joint displacement error signal from the end effector displacement error signal;
- means for providing an end effector force error signal indicative of any difference between an actual force exerted by the end effector and a desired force to be exerted thereby;
- means for calculating a selected joint force error signal from the end effector force error signal;
- means for providing a joint tuning signal, the means for providing the joint tuning signal comprising means for calculating a force component of the tuning signal by multiplying an input force tuning signal by a matrix difference between an identity matrix and a matrix product of a pseudo-inverse of the Jacobian matrix and the Jacobian matrix; and
- control signal means responsive to the joint displacement error signal, the joint force error signal and the tuning signal to provide a control signal for causing the end effector to move in accordance with the desired displacement and to exert the desired force.

8. A control system as in claim 7 wherein the means for calculating the joint displacement error signal comprises means for multiplying the end effector displacement error signal by a pseudo-inverse of a matrix product of a selection matrix and the Jacobian matrix.

* * * * *